Patented Sept. 18, 1928.

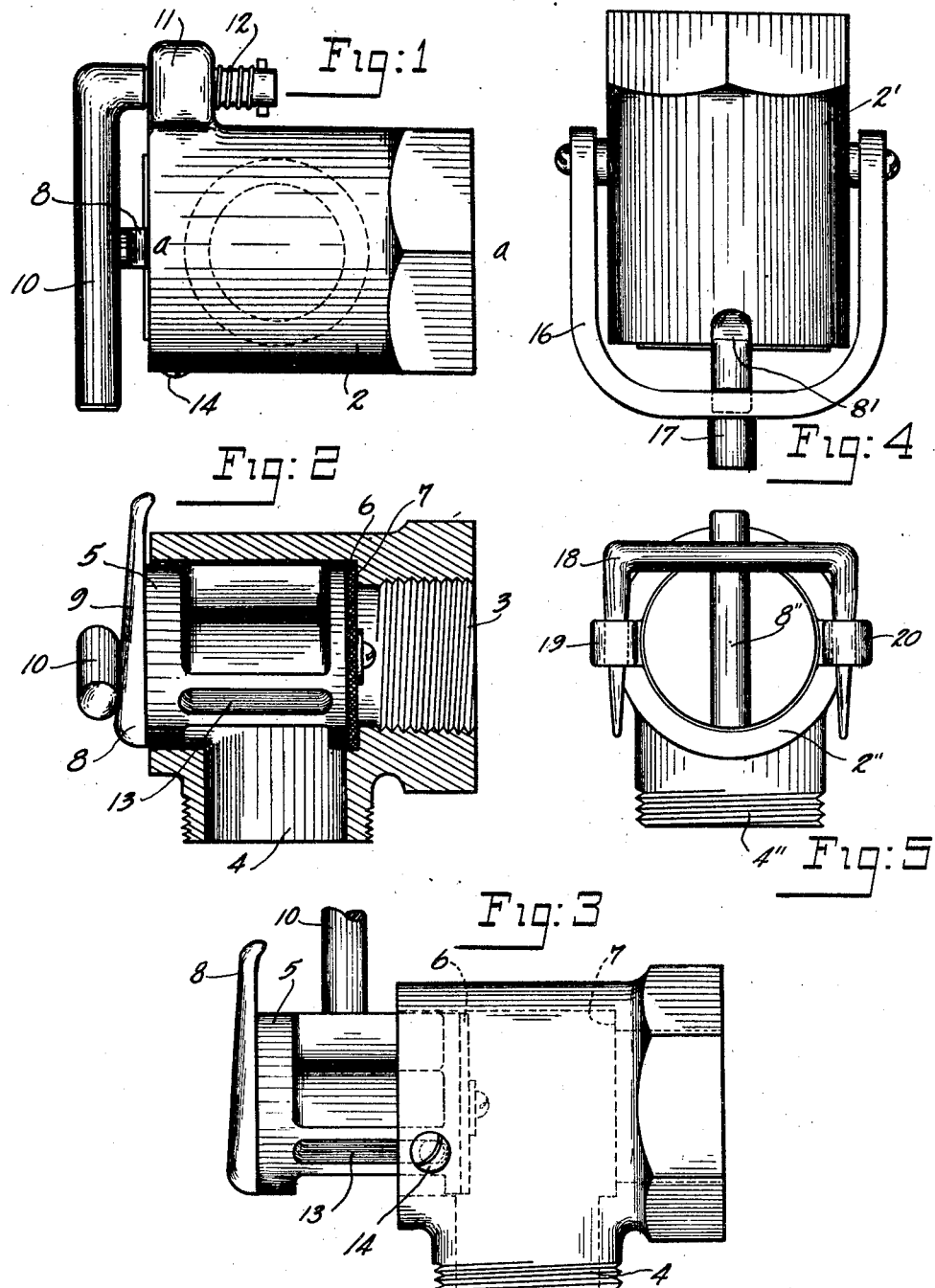

1,684,837

UNITED STATES PATENT OFFICE.

SIMEON C. LAWLOR, OF CHICAGO, ILLINOIS.

VALVE.

Application filed September 8, 1925. Serial No. 54,881.

My invention relates in general to improvements in valves and more specifically to an outlet valve of improved design, the action of which will be positive and which will not be impaired or caused to leak by the presence of grit and other particles in the fluid passing therethrough.

Considerable difficulties have been encountered where a valve is used to control the flow of a fluid containing grit or other substances which either prevent proper seating of the valve or cause wear in the valve, which eventually renders the same ineffective. This is especially true of sliding or gate valves.

Among the objects of my invention are, therefore, to provide a valve of improved construction which will effectually close irrespective of grit or sand.

To provide a valve having a plunger element which is operated by the force of the fluid pressing against the plunger to open the valve and which is effectually clamped against the valve seat to maintain the valve closed.

Other objects of my invention and features of improvement in the valve of my invention will be apparent from the following detailed description.

Referring to the accompanying drawings:—

Fig. 1 is a top view of the valve of my invention with its operating element clamped in closed position.

Fig. 2 is a view taken from the bottom of Fig. 1 with the casing shown in cross section along the line A—A and showing the plunger or valve closing element in full.

Fig. 3 is another view taken from the bottom of Fig. 1 with the plunger shown in operated position and the valve consequently open.

Fig. 4 shows a modified form of clamping device for the valve.

Fig. 5 shows another modified form of clamping device.

Referring now to the various figures of the drawing, in which like parts are correspondingly numbered, I show the valve of my invention in the form of a coupling which may be attached to a reservoir as an outlet or drain to control the flow of fluid from the reservoir. The coupling containing the valve is formed as a casing 2 having a cylindrical opening therethrough threaded at one end at 3 for attachment to a pipe or reservoir. An outlet port is formed in the lower side of the casing 2 at 4. This outlet port is threaded on its outer side so that a hose may be attached for flushing or draining purposes. At the left of the threads 4 the opening in casing 2 is reamed out to form a cup to receive a cylindrical plunger 5 which is shown in the form of a casting of any desired metal such as bronze or brass. The plunger 5 has solid front and rear walls with web flanges connecting the two and carries a gasket 6 on its inner end fitting against the valve seat 7. On its outer end the plunger 5 has a rib or handle 8 extending diametrically across the outer wall of the cylinder and extending beyond the circumference of the cylinder at one end. The rib 8 has a slanting or angular edge 9 and is engaged by a swinging arm 10 which is pivoted in a bracket 11 on casing 2 so that when it engages the slanting surface 9 of rib 8 it forces the plunger 5 into the casing and holds the valve closed as shown in Fig. 2. The valve is shown in open position in Fig. 3, and this figure shows the slot 13 formed in the plunger 5 and a screw 14 which passes through a threaded hole in the casing 2 and projects into the slot or channel 13 to limit the outward movement of the plunger. Thus it will be seen that the plunger 5, as shown in Figs. 1 and 2, is held with the bulkhead formed by the gasket 6 against the valve seat 7 by means of the arm 10 pressing down and against the angular surface of the rib 8. This effectually prevents the flow of liquid from the threaded opening 3 through the outlet port 4.

In opening the valve it is only necessary to lift the arm 10 and rotate it in a counter clockwise direction to release the plunger 5. When plunger 5 is thus released the force of the liquid against the gasket 6 is enough to force the plunger 5 out as shown in Fig. 3 and permit free flow through the port 4. The outward movement of plunger 5 is, of course, limited by the engagement of the screw 14 with the inner end of the channel 13.

In Fig. 4 I have shown a different form of locking device in place of the arm 10 of Fig. 1. This modification consists of a curved arm 16 pivoted on both sides of the casing 2' by means of screws and having a boss 17 acting as a handle. The arm 16 in this case is simply lifted to permit opening of the valve and when lowered holds the valve closed by engagement with the angular surface of rib 8'. The valve mechanism is otherwise the same as that shown in Figs. 1, 2 and 3.

In Fig. 5 is shown a still different form of locking device which consists of a part 18 which is in the form of a large staple and is inserted into a pair of eyes 19 and 20 so that the horizontal bar of the staple engages the surface of the rib 8" to maintain the valve closed.

Further modifications and variations may suggest themselves to users of such valves and I do not wish to be limited to the exact embodiment shown and described as such modifications fall within the scope of my invention.

It will thus be seen that I have designed a very simple and practical valve mechanism which will readily adapt itself to various uses and which is simple to manufacture and to maintain in use.

Having fully described and ascertained the features and aspects of my invention what I consider to be new and desire to have protected by Letters Patent will be pointed out in the appended claims:

What is claimed is:

1. In a valve, a cylindrical casing provided with an inlet port at one end and an outlet port on one side thereof, a valve seat formed in the casing adjacent the inlet port, a plunger carrying a gasket for engaging the valve seat to prevent flow of liquid from the inlet to the outlet port, said plunger movable endwise in the casing by fluid pressure past the outlet port to open the valve, and a pivoted clamping device, rotatable across the end of the casing opposite the inlet port in a plane parallel to the face of the plunger, which engages the plunger when the valve is closed and clamps the same in engagement with the valve seat, the movement of said plunger being limited by a pin and slot arrangement.

2. In a valve, a cylindrical casing provided with an inlet port at one end and an outlet port on one side thereof, a valve seat formed in the casing adjacent the inlet port, a plunger carrying a gasket for engaging the valve seat to prevent flow of liquid from the inlet to the outlet port, said plunger movable endwise in the casing past the outlet port, said plunger having an extending rib having an inclined face, means comprising a screw and slot for maintaining the rib in vertical position, and a pivoted clamping device, rotatable across the end of the casing opposite the inlet port in a plane at right angles to the plane of movement of the plunger, which engages the inclined face of the rib on the plunger and clamps the same in engagement with the valve seat.

In witness whereof, I hereunto subscribe my name this 5th day of September, A. D. 1925.

SIMEON C. LAWLOR.